(12) United States Patent
Rajaram et al.

(10) Patent No.: US 8,121,061 B2
(45) Date of Patent: Feb. 21, 2012

(54) EFFICIENT FILE MANAGEMENT THROUGH GRANULAR OPPORTUNISTIC LOCKING

(75) Inventors: Senthil Rajaram, Seattle, WA (US); Neal R. Christiansen, Bellevue, WA (US); Christian G Allred, Snohomish, WA (US); David M. Kruse, Kirkland, WA (US); Mathew George, Bellevue, WA (US); Nandagopal Kirubanandan, Redmond, WA (US); Sarosh C. Havewala, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 12/146,524

(22) Filed: Jun. 26, 2008

(65) Prior Publication Data

US 2009/0327360 A1    Dec. 31, 2009

(51) Int. Cl.
*H04L 12/56* (2006.01)
*H04J 1/16* (2006.01)

(52) U.S. Cl. ......... 370/282; 370/252; 370/412; 370/419

(58) Field of Classification Search .................. 370/282, 370/252, 412, 419
See application file for complete search history.

(56) References Cited

U.S. PATENT DOCUMENTS

2010/0023582 A1*  1/2010  Pedersen et al. .............. 709/203

OTHER PUBLICATIONS

Shepler, et al., NFS Version 4 Minor Version 1 (NFSv4, Internet-Draft, Intended Status: Standards Track, Expires: Nov. 13, 2008), May 12, 2008, 594 pages.

* cited by examiner

*Primary Examiner* — John Pezzlo
(74) *Attorney, Agent, or Firm* — Merchant & Gould PC

(57) ABSTRACT

Improved methods and systems for granular opportunistic locking mechanisms (oplocks) are provided for increasing file caching efficiency. Oplocks can be specified with a combination of three possible granular caching intentions: read, write, and/or handle. An oplock can be specified with an identifier that indicates a client/specific caller to avoid breaking the original oplock due to an incompatibility from other requests of the same client. An atomic oplock flag is added to create operations that allow callers to request an atomic open with an oplock with a given file.

18 Claims, 7 Drawing Sheets

EFFICIENT FILE MANAGEMENT THROUGH GRANULAR OPPORTUNISTIC LOCKING

BACKGROUND

In a client-server environment clients often cache data that is owned by the server. The client stores a copy of data from the server on memory, (e.g., random access memory (RAM), such as local RAM, or any other place data could be stored, such as local hard disks or flash memory devices) which is coupled to the client. The client can therefore access and modify this cached data locally without requiring communication across a network or other communication channel for accessing the data remotely at the server. File systems like the Windows NTFS file system support multiple data streams per file. Oplocks requests are made on stream handles or file handles (e.g, open/create of the file). Clients also have the ability to cache file handles so that the same handle can be re-used at a later time. For example, current operating system platforms provide four types of oplocks as follows: (1) Level 2 Oplocks (or read caching oplocks) for clients to be able to safely cache data that they read from the file system; (2) Exclusive Oplocks (or, read and write caching oplocks) for clients to be able to safely cache reads and writes, and flush modified data to the file system; (3) Batch Oplocks (or, read and write and handle caching oplocks) for clients to be able to safely cache reads and writes as well as open handles; (4) Filter Oplocks for applications/filters which read and write file data to "back out" when some other application/client tries to access the same file. The type of oplock indicates the multiple caching intents associated with the contemplated nature of remote access to fields hosted on a network server.

Opportunistic locks (or oplocks in short.) provide a mechanism to enforce distributed cache coherency when multiple entities operate on a single data stream. Opportunistic locks also provide a mechanism for clients to cache file handles without being intrusive and blocking other clients from getting access to the file. The system therefore uses methods to prevent clients from interrupting access to files among each other, such as by opportunistic locking mechanisms (oplocks). For example, the server may temporarily cause a new client to wait for the existing client (who is caching server data) to flush cached data (e.g., sending cached, modified data back from the client to the server) and cause the data on the server to be consistent, before allowing the new client access to the data.

Oplocks as they are currently defined, expose very rigid semantics and do not provide the intended caching & synchronization behavior when working with modern applications. There is a need therefore to provide adequate flexibility with oplock mechanisms in accord with work intentions in specific client environments.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a method and system for improving the efficiency of writing (e.g., storing) and/or reading (e.g., obtaining) information from remote server computers is disclosed. More particularly, clients specify use of only opportunistic locking mechanisms (oplocks) specifically associated with their usage patterns. Essentially, methods and systems are disclosed for allowing oplocks to be specified with a combination of three possible granular caching intentions: read caching, write caching, and handle caching. This allows clients to explicitly specify only the oplocks associated with their specific usage patterns. Because specifying particular caching intentions instead of a fixed bundle or a fixed level reduces the frequency with which oplocks are broken, an increase in caching efficiency across clients can be obtained. For example, an oplock break will no longer result from a client requesting a caching level that it is not intending to use, but has to request it anyway due to the limitations associated with the way oplocks were offered in a fixed bundle/level package.

In one embodiment, oplocks can be specified with an identifier (e.g., an oplock key) that signifies a client/specific caller instead of being identified with an open handle to a file or a stream. This avoids the problem of requests from the same client breaking the original oplock due to an incompatibility.

In one embodiment, an atomic oplock flag is added to a create operation that allows the caller to request an atomic open with an oplock for a given file. For example, if a file is already open by someone else the open request could fail if it is incompatible with the oplock granted to a first client. However, if an open request comes into the system while the atomic oplock open request is being processed, the second open will be held until the open with the atomic oplock request has completed. The second open will be continued and oplock processing can occur.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
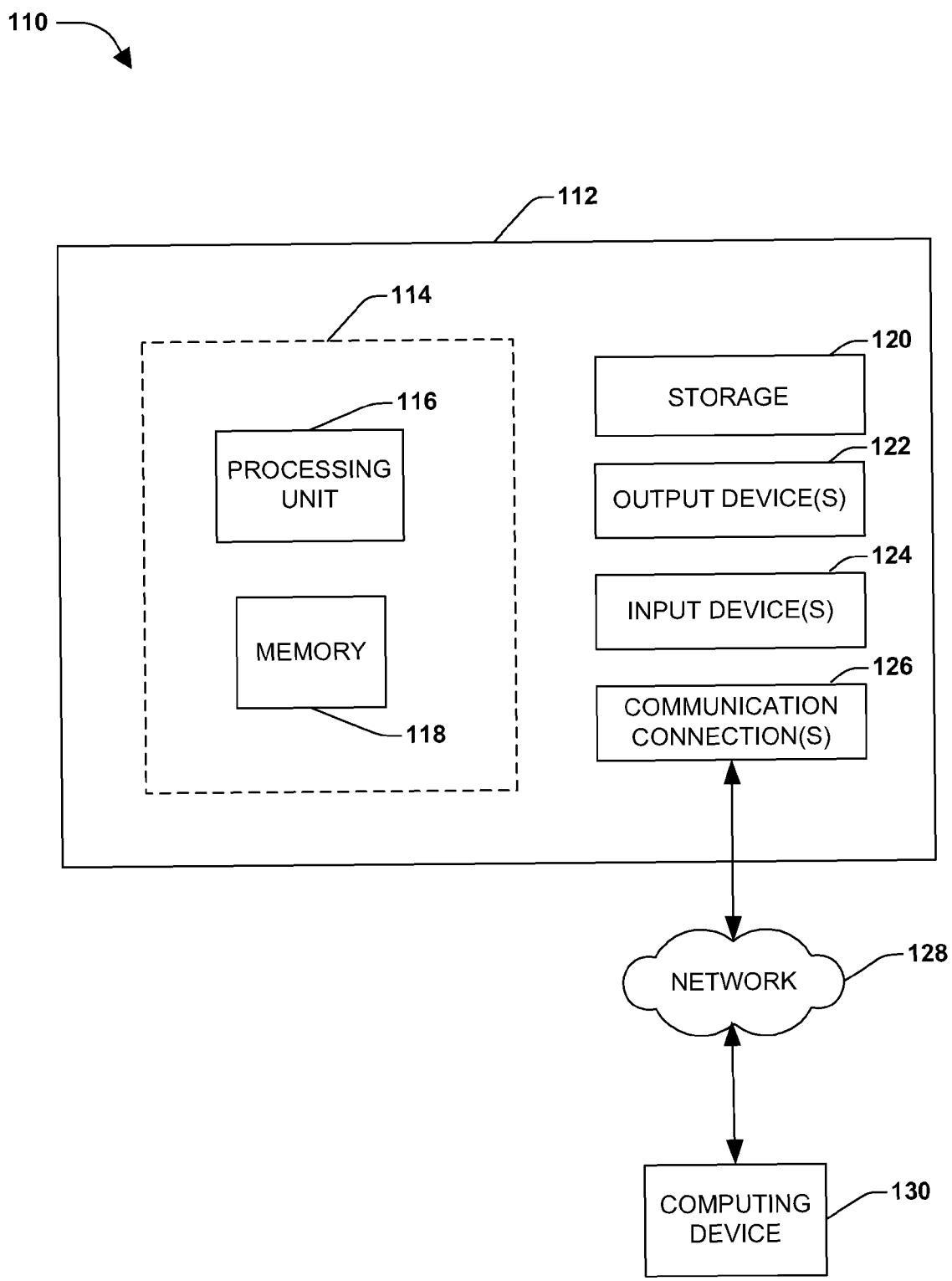
FIG. 1 illustrates an exemplary computing environment wherein one or more of the provisions set forth herein may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Oplocks are introduced into the file system to provide clients the ability to cache data and at the same time provide a mechanism to provide data consistency when multiple clients read/write from the same stream or file. Caching of data is a technique used to speed network access to data files. It involves caching data on clients rather than on servers when possible. The effect of local caching is that it allows multiple write operations on the same region of a file to be combined into one write operation across the network. In addition, the advantage of caching for read operations is that data does not need to constantly be requested from the server if it is read multiple times. Local caching reduces network traffic because the data is sent across the network once. Such caching improves the apparent response time of applications because the applications do not wait for the data to be sent across the network to the server.

Oplocks primarily serve as synchronization mechanisms to allow a caller or client to keep cache data coherent. An oplock is broken when a third party performs an operation on the file from which the client obtained the oplock. For example, if a client reads from a file on a server and another client attempts to write to the file, the cache of the first client could be different than the actual state of the file on the server without the oplock notification mechanisms.

The existing oplock mechanism suffers from several drawbacks in a modern environment, such as an inability to request sufficiently granular caching levels (e.g., specify particular combinations of read, write, and/or handle caching), the fact that oplocks are per-handle rather than per-client, and scenarios in which oplocks are broken unnecessarily. In addition, transparency (e.g., the desire to remain unobtrusive in the ability of the client accessing/caching the file stream to get out of the way if another client wants access) can be lost between the time of opening the file and obtaining an oplock on the file if someone else tried to open it during that time. These drawbacks all translate into significantly increased network traffic between clients and servers and inefficient caching for clients.

Deficiencies can exist when relying on a client application opening a file only once. For example, in scenarios where a shell (e.g., computer user interface) may be trying to query icon attributes and at the same time a document application is trying to open and save documents, the oplock can be broken (i.e., transition to a different oplock state of lesser or no caching) and thereby read/write operations may be slower because they have to go across the network. In a further example, the shell may be trying to render the document to a smart icon and concurrently some search indexer may be trying to index the content. When two of these accessors decide to look at the file simultaneously the ability of that client to cache data for write/read could get revoked.

The techniques and systems, provided herein, relate to a method for improving the efficiency of writing (e.g., storing) and reading (e.g., obtaining) information from remote server computers. More particularly, an opportunistic locking mechanism (oplock) package will allow oplocks to be specified with a combination of three possible granular intentions (e.g., read cache, write cache, and/or handle cache), thereby allowing clients to explicitly specify only the oplocks associated with their specific usage patterns and increasing the efficiency of caching across clients.

File systems like NTFS support multiple data streams per file. Oplocks requests are made on stream handles. For file systems that do not support alternate data streams, then the word "stream" refers to "file". The following description will depict the oplock mechanisms from a high level starting with an exemplary computing environment in FIG. 1 and then focus more on other exemplary details.

FIG. 1 and the following discussion provide a brief, general description of a suitable computing environment to implement embodiments of one or more of the provisions set forth herein. The operating environment of FIG. 1 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

FIG. 1 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 1 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 1 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Figure 2:
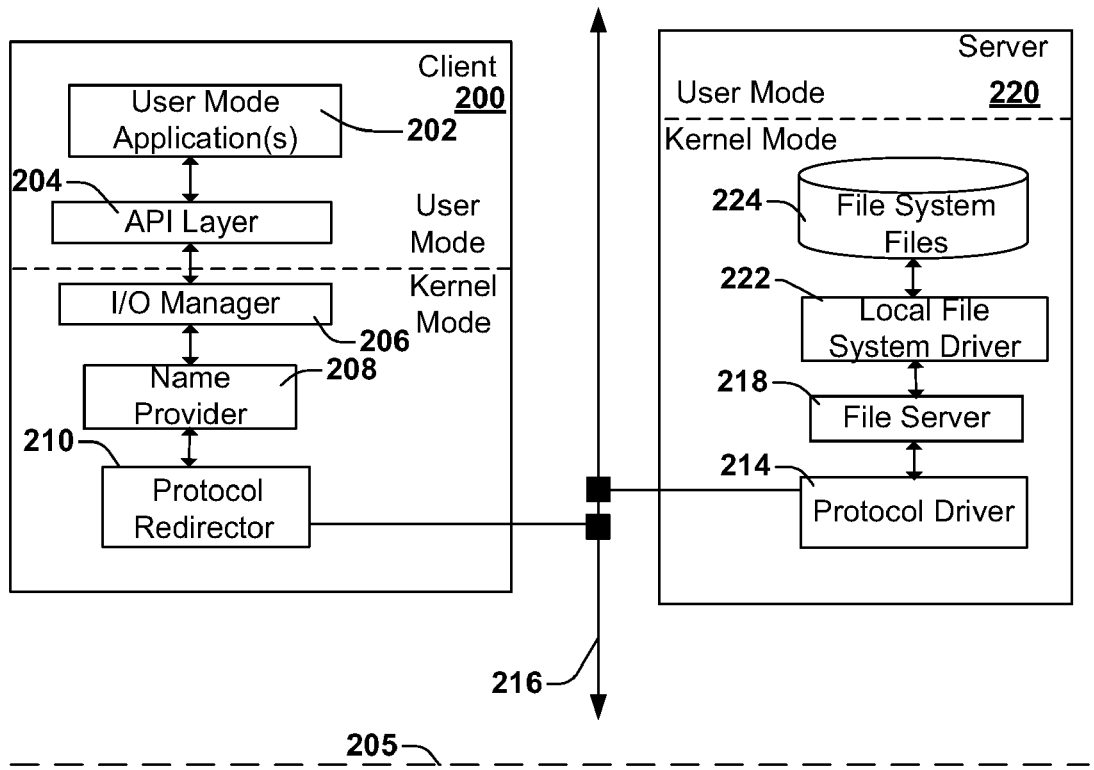
FIG. 2 is a block diagram illustrating an exemplary system for a file server and client interaction implementing an oplock request wherein one or more of the provisions set forth herein may be implemented.
Figure 2:
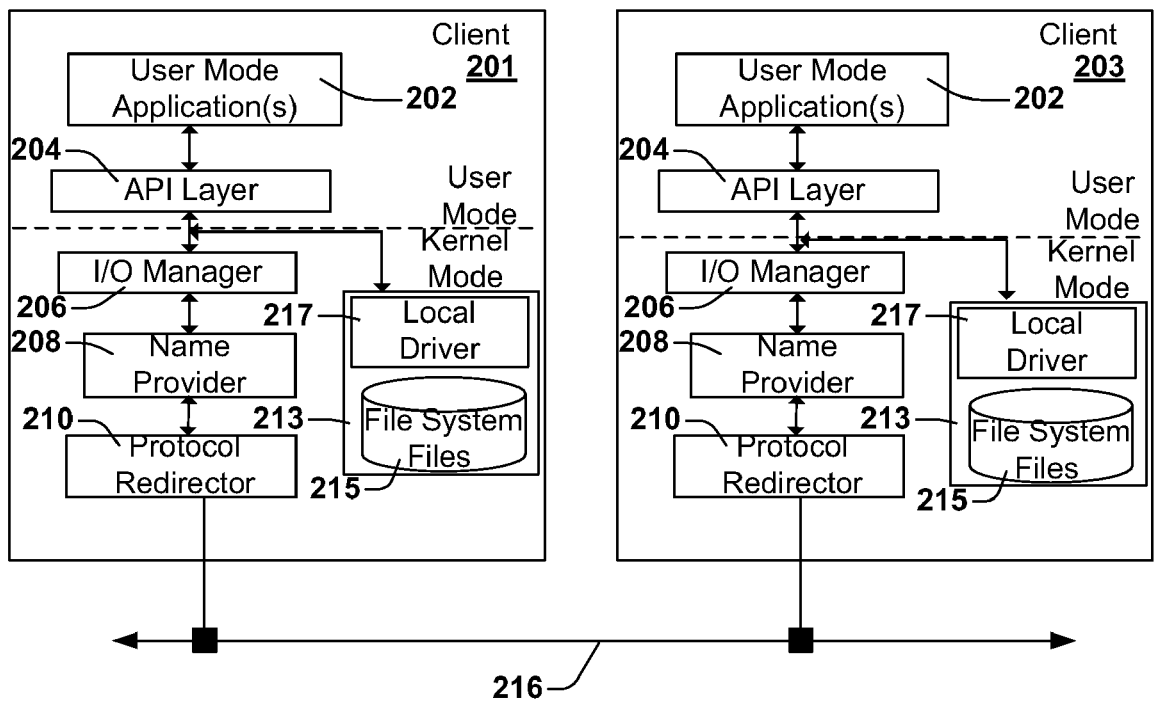

Turning to FIG. 2, there is shown a client machine 200 (such as corresponding to the device 130 of FIG. 1) including at least one user mode application program 202, which requests various system functions by calling application programming interfaces (APIs) 204. At the top of the broken line 205 is illustrated a client-server interaction and at the bottom of line 205 a client-client interaction is illustrated.

For accessing files stored on a remote network server 220 (e.g., a file server such as the network 128 of FIG. 1), the application 202 places file input output (I/O) API calls directed to a network resource to an API layer 204. For example, applications can examine or access resources on remote systems by using a UNC (Uniform Naming Convention) standard with Win32 functions to directly address a remote resource, e.g., via a drive mapped to a network shared folder or the like.

When a file I/O API (e.g., a file open or create request) is called with a remote filename such as a UNC name, a file I/O request is received at an I/O manager 206. To handle the remote name, the I/O manager 206 calls a name provider 208 to figure out which device handles the name. In other words, the name provider 208 (e.g., comprising a kernel mode driver) determines which network to access when an application 202 uses an I/O API to open a remote file upon a create request.

To determine a device that can handle the given name, the name provider 208 polls (via asynchronous I/O request packets, or IRPs) any redirectors that have previously registered with the name provider 208, e.g., the protocol redirector 210 in FIG. 2. Each redirector that can handle the name responds back affirmatively, and if more than one respond, the name provider 208 determines from a priority order (e.g., maintained in at least one system registry key or the like) which one has precedence to handle the request.

As part of the response to the name provider 208, each redirector that recognizes the name indicates how much of the name is unique to it. For example, if the name is the UNC name \SERVER\SHARE\foo\bar1.doc, the redirector 210 recognizes the name as capable of being handled, and if the server responds by claiming the string "\SERVER\SHARE" as its own.

When at least one redirector (e.g., the redirector 210) responds and provides the caching information, the name provider 208 driver caches the information in association with the redirector that responded, (if more than one, it caches the information of the one that takes precedence), whereby further requests beginning with that string are sent directly to that redirector 210, without the polling operation. For example, if the redirector 210 comprises an SMB redirector, future SMB requests directed to a network share corresponding to a cached string are passed to the redirector 210, which then packages those SMB requests into a data structure that can be sent across the network to that remote SMB server.

In one implementation, the redirector 210 is a kernel mode component that provides I/O requests to a remote server 220 via a protocol driver (e.g., TDI transport) 214 connected to a communications link 216. The server 220 receives the I/O requests at a counterpart protocol driver 214, and passes them to a file server 218 and local file system driver 222 (e.g., FAT or NTFS) on its local file system files 224. The server 220 uses a file system driver that communicates with the server driver on a remote server system. In addition, the server file system driver 222 and the file server 218 service work for the connections requested by client-side redirectors, forwarding them to the appropriate local file system driver, such as NTFS.

In one embodiment, when accessing files on remote servers 220, for example, the file server and not the client application 202 requests the opportunistic lock from the remote server 220. Client applications directly request opportunistic locks when the oplock is intended for a file on a local file system (as shown on the bottom of FIG. 2). This is illustrated between client 201 and client 203 below the broken line 205. The client 201 comprises similar components as client 200 above the broken line 205 and in addition comprises a storage component 213. The storage component 213 comprises file system files 215 local to the client and accessed via a local driver 217 through the I/O manager 206 and/or through the API layer 204. When an oplock is requested by the client on a local file the request goes directly to the local file system and does not travel over the remote I/O path as indicated in the client-server interaction above broken line 205, which separates the two different interactions. Other clients connected to the communication link 216, for example client 203, therefore are also benefited from the oplock mechanisms intended for a file on a local file stream.

Oplocks, as currently implemented, are granted to an open handle. This implies that if multiple handles are opened to the same file, the oplock state gets affected. It is common to see applications opening multiple handles to the same file with different access/share modes. If a client has an oplock on the first handle, the second open by the same client can result in the oplock being revoked or downgraded thus resulting in the client losing the ability to efficiently maintain its cache.

One embodiment is to provide an oplock key that identifies a client interacting on a file instead of identifying the file by its object or on a per handle basis (e.g., at file open). In other words, a client can still cache data and file handles when there are multiple handles open to that file, provided they are all associated with the same oplock key. The oplock key can be provided by a client via the protocol, or in another embodiment, the oplock key can be generated by the server protocol driver 214 on behalf of the client.

One example of the embodiment is if multiple users are logged onto a terminal services machine reading the same document and are all coming from the same client, all of them could be reading and writing while the cache is coherent across all of the multiple users of the same machine with an oplock key identifying them as such. By granting oplocks to a client instead of by handle, it would prevent two handles from the same client from breaking each other's oplock.

The oplock key is passed as a parameter, to a create (open) request. If an open request comes in on a file that has an oplock associated with it and the existing oplock has the same oplock key as the new request, the oplock package can avoid breaking the oplock unnecessarily. The parameter can be either a Global Unique Identifier (GUID) or a 128 bit quantity or an opaque blob. The oplock key can be provided by a client via the protocol, or in another embodiment, the oplock key can be generated by the server protocol driver 214 on behalf of the client. The server filesystem driver 222 uses this identifier to check for oplock requests from the same client and prevent two handles from the same client from breaking each other's oplock. One advantage of using an opaque blob would be that it can be used to maintain compatibility information (the file object) for interoperability with older API(s).

The life of an oplock includes three distinct time spans. During each, the server determines by different means its reaction to a request from a client to open a file locked by another client. In general, the impact an application has on other clients and the impact the other clients have on the application can be minimized by granting as much sharing as possible, requesting the minimum access level necessary, and requesting an oplock describing the least level of caching needed for a particular application.

One time span is the period after the server opens a file for a client but before it grants an oplock. During this time, no oplock exists on the file, and the server depends on sharing, and access modes to determine its reaction to another request to open the same file. For example, if the file in question is opened for write access, that open may inhibit granting opportunistic locks that allow read caching access to other clients. In one example, the sharing and access modes of other opens may not be examined when granting an oplock. In this scenario, the read caching oplock would actually be granted, though the next time the writer actually performed a write the read oplock would be revoked. The time span before the server grants a lock is typically in the millisecond range but may be longer.

Figure 3:
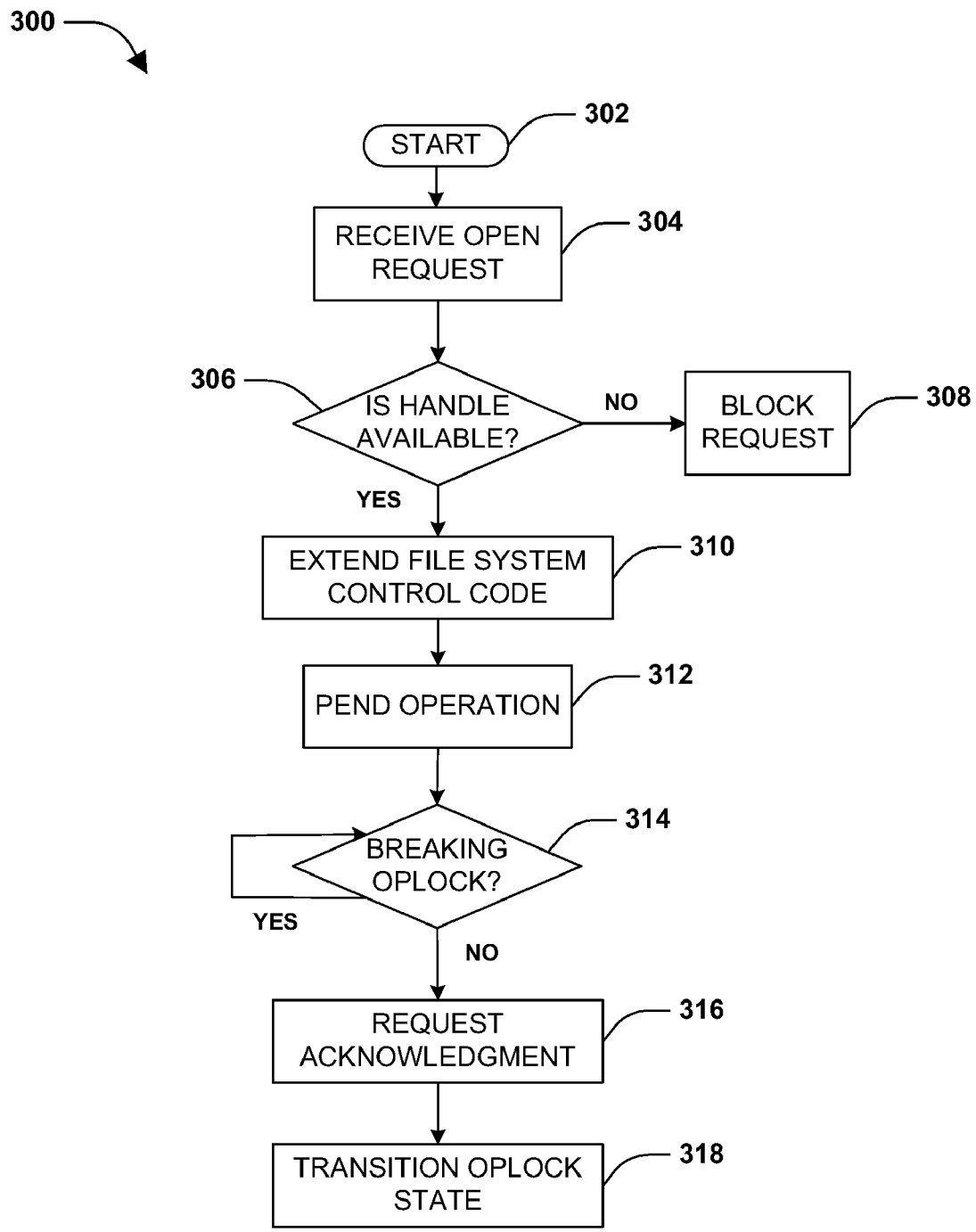
FIG. 3 is a flow chart illustrating an exemplary method for managing files in a network environment by means of oplock request.

FIG. 3 illustrates an example of the way an oplock is obtained upon the request for a file handle (e.g., a handle to an opened file) in accordance with one embodiment. The method 300 initiates at 302 of a network session when a client first opens a file. An open request is received by a file system at 304. The file system determines if the handle is available 306 and if it is not, then the request is blocked 308. The open gives the client a handle to the file if it is available. A server-side entity (e.g., a server control component) requests the oplock (e.g., by a file system control code) from the file system on the server at the request of a remote client. For example, the file system control code can be extended on the handle by the request being passed to a buffer that describes the particular oplock specified 310.

In one embodiment granular caching intentions for an oplock may be specified in accord with cache write, cache read, and/or cache handle combinations. At 312 the request is pended in the file system on the server and a data code is returned to the server-side entity indicating that the operation is pending. In one embodiment, the client can receive an indication that the status is pending and/or an indication that the request to cache has been granted at an appropriate level. In another embodiment the only indication that the client receives can be whether the open succeeded or not. In other words, the fact that the server did an oplock request can be transparent to the client.

Whether the oplock is broken depends on its completion 314. When the request for the oplock ultimately completes, it comes out of its pending state and returns back to the client, then it is said that the oplock has been broken. Breaking an oplock means transitioning from the current oplock state to a state of lesser caching. The client whose operation broke the oplock is delayed and the server notifies the client holding the opportunistic lock at 314.

The client holding the lock then takes actions appropriate to the type of lock, for example abandoning read buffers, closing the file, and so on. Only when the client holding the opportunistic lock notifies the server that it is done does the server allow the oplock breaking operation to continue. When the pended oplock request returns, an output buffer (not shown) indicates whether the client must acknowledge at 316 an oplock break or not. In addition, the output buffer indicates to what oplock level the original oplock has been broken. For example, if a client took out a read/write/handle (RWH) oplock that oplock may have been broken to read/write or to read or to none (i.e. no caching).

The client may or may not be required to acknowledge the break. Oplock breaks requiring acknowledgement are those whose caching states require that the client be given the opportunity to place the file on the server into a coherent state. For example, if multiple writes exists on the client's local cache they may need to be flushed out to the server. An acknowledgement allows time to flush out these writes that are being held on the client's cache but have not been saved, for example, to the server and then acknowledge the break. This essentially acknowledges that all the writes have been flushed out and the oplock is ready to be relinquished for transition to another oplock state at 318.

Figure 4:
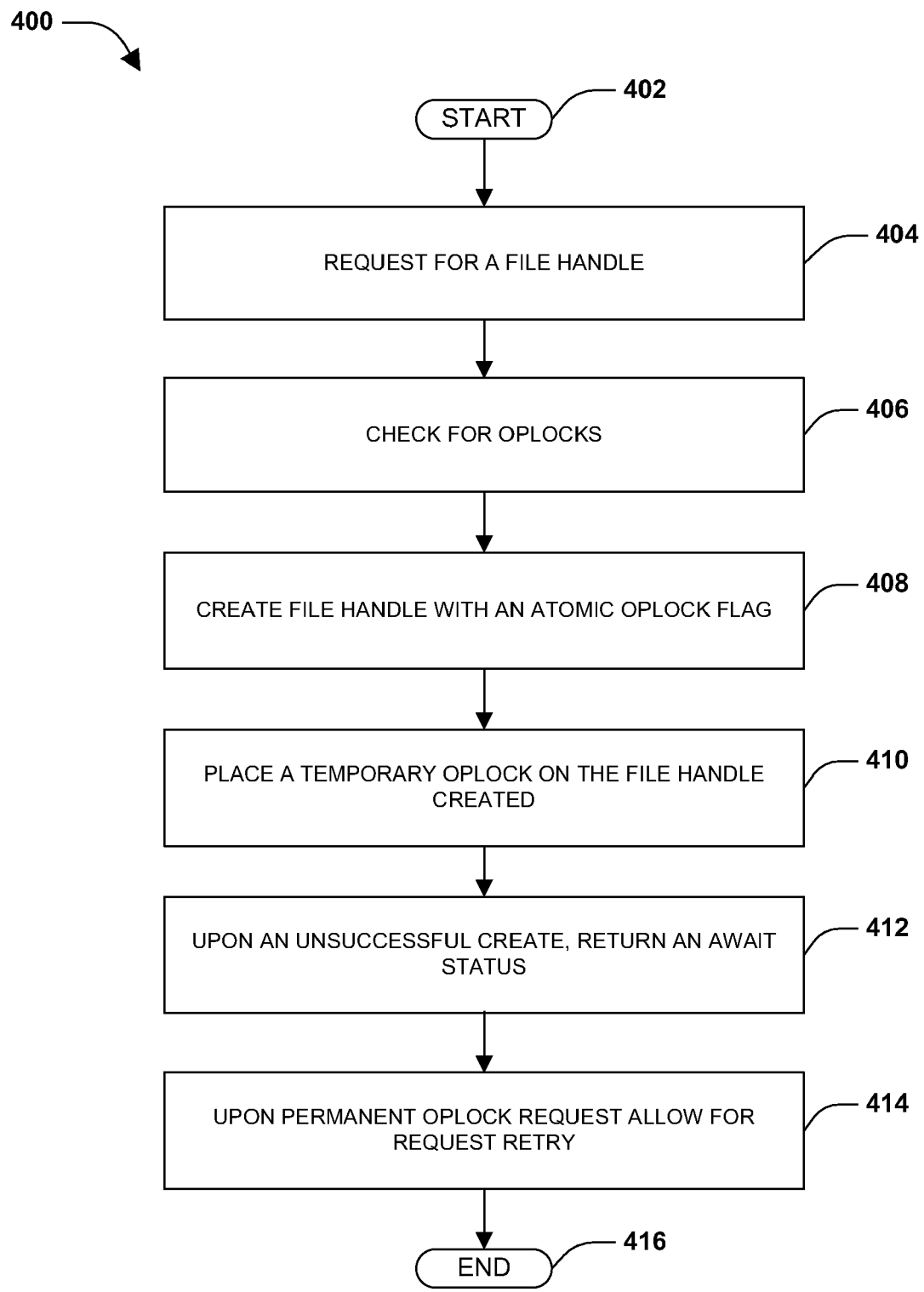
FIG. 4 is a flow chart illustrating an exemplary method for managing files in a network environment by means of oplock request.

Referring now to FIG. 4, one embodiment of a method 400 is illustrated where an atomic oplock create flag is provided with a request to create an open file handle thereby removing the window of time between the time the file is opened, when no oplock is on the file, and the time the client requests an oplock.

Method 400 is useful for certain applications, such as search indexers, that need to open files with minimal interference to other file system activity. For example, in one system a search indexer could obtain an oplock after opening a file to allow it to be notified of a subsequent open (by another accessor) so that it may get out of the way, such as by closing the file or downgrading the oplock. However, during the window of time between the moment when the indexer opens the file and the moment when the indexer gets an oplock another application could try to open the file and get an error, therein breaking the expectation that the indexer's activities would be non-intrusive. In addition, the act of opening the file to get the oplock can break existing oplocks on the file being indexed, possibly forcing a flush and reopen across a network.

The method 400 initiates at 402 and then proceeds at the request for a file handle 404 (e.g., a handle to an opened file), which is illustrated by way of example in FIG. 3, as described supra and encompasses the method of FIG. 3 as one embodiment. The method 400 continues at 406. In one embodiment, a check is performed for oplocks existing and, if they exist, the create request is disallowed. This prevents breaking oplocks that may already exist. The check therefore prevents the destruction of any unobtrusiveness desired by an indexer.

At 408 a file handle is created if no other oplocks exist. In one embodiment, a flag is added to the created file that is an atomic oplock flag. The atomic oplock flag tells the oplock package in the file system to effectively reserve an oplock, such as a temporary oplock on the file handle created at 410. If the create succeeds, then for the purposes of subsequent attempts to open the stream it can then be treated as though it has a read/write/handle (RWH) oplock on it until the client/caller who used the atomic oplock flag actually requests its oplock. This means that requests using an oplock key or client identifier other than the one used for this create will be blocked as though awaiting acknowledgement at 414 of an oplock break. In some cases even though a request from a second client is made with a different oplock key if the request on a second client is compatible with the oplock granted to the first client then this will not break the oplock. Once the actual oplock is requested these requests will be allowed to retry at 414 and ends at 416.

In one embodiment, the atomic oplock flag allows a filesystem to check for oplocks before performing a create, and fail the create if an oplock already exists on the file. If no oplock is present, the create specifying the atomic oplock flag will be allowed to succeed. If an oplock is present, the create will fail with a status code indicating that an oplock exists and cannot be broken. If the create fails for any reason there will be no RWH "reserved oplock" state on the file/stream when file create returns.

If the create succeeds the caller must subsequently request an oplock in a timely manner to release the "reserved oplock". Requesting an oplock level of 0 will suffice, and will result in releasing the "reserved/temporary oplock" without granting an active/permanent oplock. Clients/callers using the atomic oplock flag may request any type of oplock.

Figure 5:
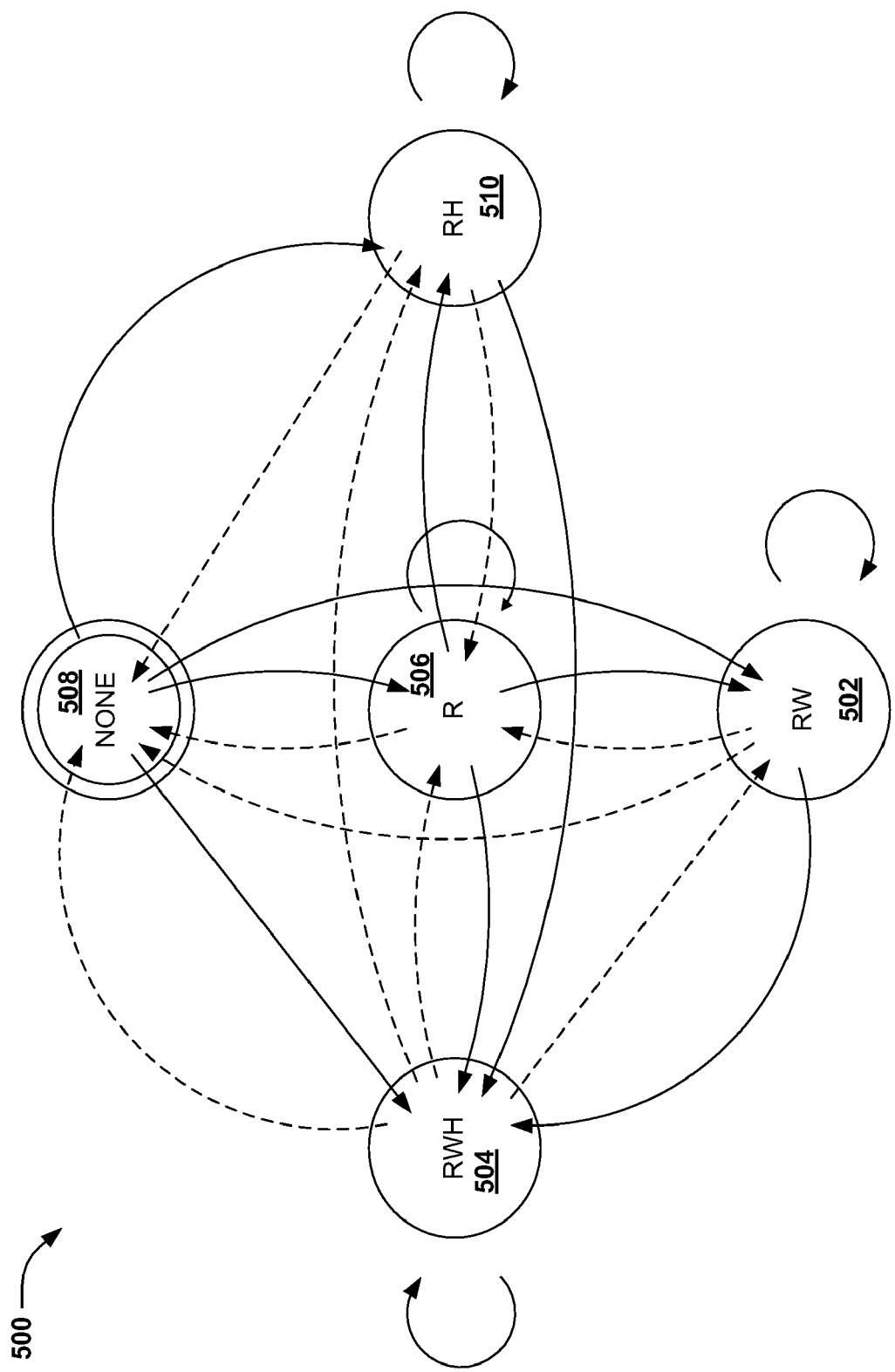
FIG. 5 is an exemplary state diagram of oplock states and transitions therebetween.

FIG. 5 illustrates one embodiment of a state flow diagram 500 illustrating granular caching intentions that can be specified in accord with the disclosure. Cache read, cache write, and cache handle are different caching intentions that a client may intend to specify for a file. The flexibility to specify various combinations of caching intentions provides greater granularity to the oplock mechanisms.

Cache read allows clients to cache read operations and can be granted to multiple clients. Read caching oplocks are broken when a different client writes data or acquires byte range locks on the same file. A break of such an oplock is asynchronous and does not need to be acknowledged. Cache write allows clients to cache write operations. These can only be granted to a single client. The oplock must be broken (e.g., revoked) only when a different client (different from the one currently holding the "write caching" oplock) opens the file for read/write. The revocation is synchronous. Handle caching allows clients to cache open handles and can be granted to multiple clients. The "handle" oplock gets broken when a new open (different client) conflicts with the access/share modes of an existing open. The break is always synchronous and it is triggered after a share access check fails. Handle oplocks allow a client filesystem redirector to cache an open file handle even after the client application has closed its handle to the file. It also allows the client filesystem redirector to collapse multiple file handles opened by the application onto a single handle on the server. When the handle oplock is lost, the client has the ability to "un-collapse" any collapsed handles by replaying the actual opens to the server. This allows a client to collapse handles requiring lesser access onto an existing handle with more access, provided the sharing modes allow such handles to co-exist.

Cache read, cache write, or cache handle on a system may be specified in any combination instead of having bundled options, such as level 1, level 2, Batch, or filter oplocks. For example, separating out the flags to not be purely batch or level 2, but using a combination of different flags to be able to cache writes, cache reads, or cache handles is illustrated.

FIG. 5 illustrates exemplary transitions from one oplock state to another with oplocks that may be specified with a combination of three possible caching intentions: oplock level cache read, oplock level cache write, and oplock level cache handle. The solid arrows indicate an oplock acquire transition and the broken arrows indicate an oplock break or downgrade transition. Unlike prior implementations the oplocks are described as combinations of caching intentions, rather than as fixed levels, allowing a client to specify caching levels in a flexible manner, and allowing for transitions from one level to another that provide the ability to retain at least some cached data for longer periods of time. Various exemplary oplock states are illustrated, for example, an RW oplock state 502 illustrates a cache read and cache write oplock that allows the client holding the oplock to read/write and maintain data coherency. In one embodiment, each oplock can be in a particular state and depending on the request made to the oplock package and file system operations that are made, the oplock transitions from state to state. For example, a first client may request and be granted a read/write/handle (RWH) oplock. A second client may try to open the same file for read access and not specify the same oplock key specified in the first client's create request. Consequently, the result is a transitioning of the state of the granted oplock from read/write/handle to something else, such as read, for example. The first client who was originally granted the oplock would be notified that its oplock was broken. It would then be given a chance to make the file on the server coherent. The first client that was originally granted the oplock that is now broken would indicate that it acknowledges the second client's request and the oplock breaking operation would then proceed, having transitioned the oplock state from the read/write/handle to the read state, for example.

In FIG. 5 a read/write (RW) state 502 is illustrated that may transition to another RW 502 oplock or a RWH 504 oplock. The solid arrows indicate an oplock acquire transition and the broken arrows indicate an oplock break or downgrade transition. For simplicity of explanation in all upgrade cases illustrated the transitions are shown from the point of view of a single client/caller and using a given oplock key and where a second client/caller's request is made with the same oplock key. All downgrade cases illustrated are the result of a request made with a different oplock key from the one associated with the oplock being downgraded. For example, a client/caller who holds a RW oplock 502 may request another RW 502 oplock or a RWH 504 oplock on a different handle to the same file using the same oplock key. This would result in the first oplock's request being completed and no longer pending; the request would be completed with a status code indicating that the oplock had been switched to a different handle. As another example, a RW oplock may be broken to R 506 or none 508, depending on the request that caused the oplock to break. In another example, the RH 510 oplock break transition from RH 510 to none 508 could happen if upon receipt of the break notification from RWH 504 to RH 510, the oplock owner opted to drop the oplock completely in its acknowledgement, rather than accept the RH 510 oplock state.

The read/handle 510 state in FIG. 5 is a state available in one embodiment of the disclosure. In one embodiment, a client can upgrade its cache level instead of being constrained to just downgrading. For example, when a handle is open on a file with handle caching as well as read caching, if the first client wants to make modifications it can then attempt to upgrade from read/handle cache to read/write/handle caching.

Figure 6:
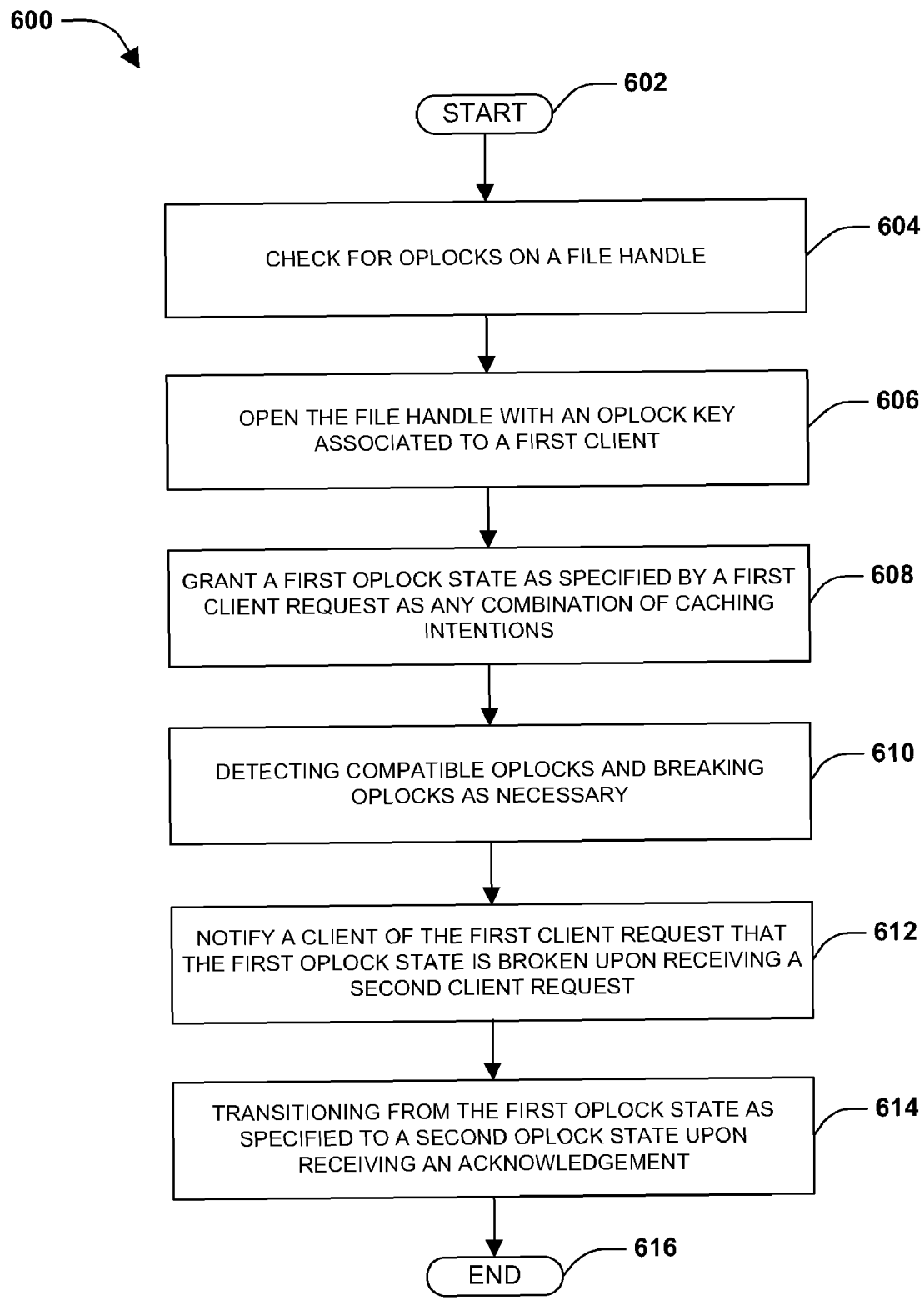
FIG. 6 is a flow chart illustrating an exemplary method for managing files in a network environment by means of oplock requests.

FIG. 6 illustrates a method 600 for allocating and managing files in a multi-user network environment having at least one server with a file directed for shared usage. The method 600 initializes at 602 and proceeds to 604 with a check for oplocks already existing on a file handle as in FIG. 3 for example discussed supra.

The file handle is created with an oplock key (e.g., client identifier) associated to a first client 606 that makes a first oplock request. The redirector can give the server a single oplock key for all opens that occur on the server. In this manner multiple callers on the client can open a file while appearing as a single open to the server. Instead of losing the ability to cache writes when a second handle is opened by the same client, the oplock key identifies a client and prevents two or more file handles from the same client from breaking each other's oplock state.

In one embodiment, a share check is performed to check for any sharing violations. Upon discovering that a sharing violation exists, any handle-caching oplocks are subsequently broken. Thereafter, the share check retries checking for any other sharing violations. If there is a sharing violation thereafter the open request fails. In one embodiment, the oplock key is passed at open time as an extended create parameter in an I/O request packet and stored in a file object extension. The oplock key allows two or more file handles from the same client to avoid breaking each other's oplock state. This prevents unnecessary oplock breaks and extraneous cache flushes to the server, thus avoiding clogging the network.

In one embodiment, a first oplock state can be specified by a first client request, for example, as any combination of caching intentions at 608 of the method 600, comprising: read caching, write caching, and/or handle caching.

In one embodiment, a transition of an oplock from one state to another may be made to upgrade the oplock to a higher caching level. For example, a read/write oplock may transition to a read/write/handle oplock.

At 610 compatible oplocks are detected and oplocks are broken if necessary (e.g., downgraded). Upon receiving a second client request that breaks the oplock of the first client, the first client is notified that the oplock has been broken at 612. This can occur when the second client's request is incompatible with the first client's request and the oplock key is different to the oplock key associated with the first client. However, if the second client's request is compatible with the oplock granted to the first client then a different oplock key will not necessarily break the oplock granted to the first client.

At 614 the first oplock state is transitioned to a second oplock state upon the file system receiving an acknowledgement that the first oplock state is broken. The method ends at 616.

Figure 7:
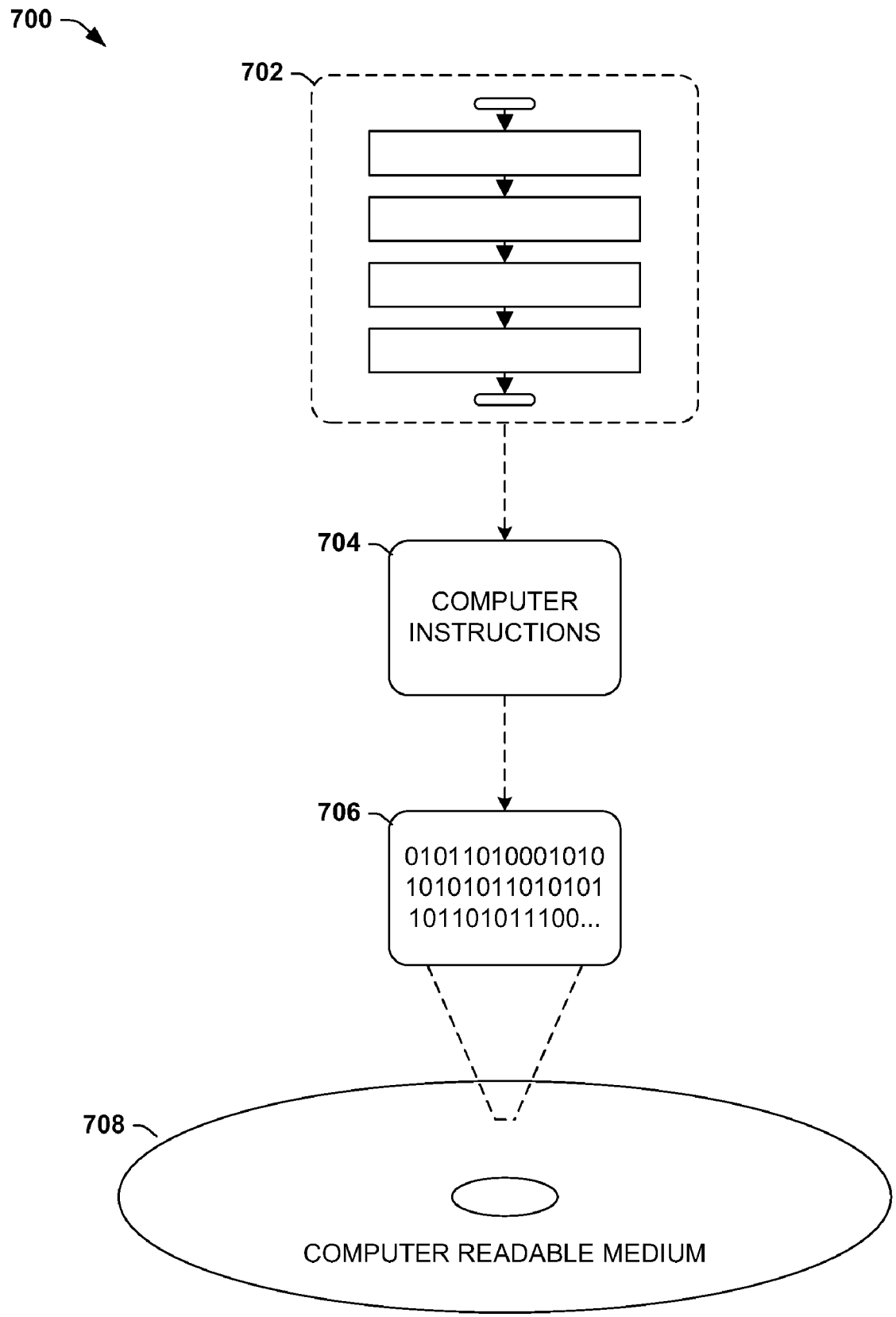
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 700, the processor-executable instructions 704 may be configured to perform a method, such as the exemplary method 600 of FIG. 6, for example. In another such embodiment, the processor-executable instructions X may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for maintaining distributed cache coherency across multiple clients accessing a file or a shared resource, comprising:
    opening a file handle with an oplock key associated to a first client;
    receiving a request from the first client for a first oplock state, the request indicating an intent to locally cache one or more of: write data, read data, and the file handle;
    granting the first oplock state to the first client; and
    in response to receiving an acknowledgement that the first oplock state is broken, transitioning from the first oplock state by granting the first client a second oplock state that is different from the first oplock state.

2. The method of claim 1, wherein opening the file handle with an oplock key associated to the first client comprises:
    checking for oplocks on the file handle;
    creating the file handle with an atomic oplock flag;
    placing a temporary oplock on the file handle; and
    upon an unsuccessful request by a second client, returning with an await status signifying that the temporary oplock is not able to be broken and allowing for the unsuccessful request by the second client to be retried, or blocking the second client's request thereafter.

3. The method of claim 2, where the atomic oplock flag prevents breaking of the first oplock state between a time when the first client opens the file and when the first oplock state is specified by placing a temporary oplock on the file.

4. The method of claim 1, wherein the oplock key identifies the first client and prevents two or more file handles from the first client from breaking each other's oplock state.

5. The method of claim 1, further comprising:
    notifying the first client of the first client request that the first oplock state is broken upon receiving a second client request without the oplock key associated to the file handle originally opened;
    providing an opportunity for the client to flush any unwritten data to the server, re-open any handles which were collapsed on the client, close any cached handles and purge its read cache; and
    transmitting the oplock key to a file system control and storing the oplock key.

6. The method of claim 1, where the second oplock state specifies a higher caching level than the first oplock.

7. The method of claim 1, further comprising:
    performing a share check to determine a sharing violation, and upon discovering a sharing violation breaking existing handle oplocks; and
    performing the share check for a second time; and upon discovery of a sharing violation, failing any file open requests.

8. The method of claim 1, further comprising:
    breaking the first oplock state when a second client makes an incompatible request on the file handle associated with a different oplock key.

9. A file server comprising:
    a storage having a file directed for shared usage;
    an interface to a network; and
    a processor, the storage operating from control signals of the processor to enforce opportunistic locking semantics for accessing the storage across the network, the opportunistic locking semantics enforced among the plurality of clients, the processor configured to:
        open a file handle of the file directed for shared usage with an oplock key associating a first client to the file handle;
        receive a request from the first client for a first oplock state, the request indicating an intent to locally cache one or more of: write data, read data, and the file handle;
        grant a first oplock state to the first client; and
        transition from the first oplock state to a second oplock state different from the first oplock state in response to receiving an acknowledgement that the first oplock state is broken.

10. The file server of claim 9, wherein the opening the file handle with an oplock key associating the first client to the file handle comprises:
    checking for oplocks on the file handle;
    creating the file handle with an atomic oplock flag;
    placing a temporary oplock on the file handle; and
    upon an unsuccessful request by a second client, returning with an await status signifying that the temporary oplock is not able to be broken and allowing for the unsuccessful request by the second client to be retried, or blocking the second client's request thereafter.

11. The file server of claim 10, where the atomic oplock flag prevents breaking of the first oplock state between a time when the first client opens the file and when the first oplock state is specified by placing a temporary oplock on the file.

12. The file server of claim 9, wherein the oplock key identifies a client and prevents two or more file handles from the client from breaking each other's oplock state.

13. The file server of claim 9, the processor further configured to:
    notify the first client of the first client request that the first oplock state is broken upon receiving a second client request, wherein the second client request does not include the oplock key associated to the file handle originally opened; and
    transmit the oplock key to a file system control for storing the oplock key.

14. The file server of claim 9, where the second oplock state specifies a higher caching level than the first oplock state.

15. The file server of claim 9, performing a share check before breaking the first oplock state.

16. The file server of claim 9, comprising:
breaking the first oplock state when a second client makes an incompatible request on the file handle with a different oplock key.

17. A method for allocating and managing files in a multi-user network environment having at least one server with a file directed for shared usage, comprising:
opening a file handle with an oplock key associated to a first client, wherein the oplock key prevents two or more file handles from the first client from breaking each other's oplock state;
granting a first oplock state as specified by a first client request, the first client request indicating an intent to perform locally one or more of: read caching, write caching, or handle caching; and
transitioning from the first oplock state as specified to a second oplock state upon receiving an acknowledgement that the first oplock state is broken, the transitioning comprising:
notifying the first client that the first oplock state is broken in response to receiving a second client request without the oplock key;
providing an opportunity for the client to flush any unwritten data to the server, re-open any handles which were collapsed on the client, close any cached handles and purge its read cache;
transmitting the oplock key to a file system control to store the oplock key;
performing a share check to determine a sharing violation, and upon discovering a sharing violation breaking existing handle oplocks, if any;
performing the share check for a second time; and
upon discovery of a sharing violation, failing any file open requests.

18. The method of claim 17, wherein the opening the file handle with an oplock key associated to the first client comprises:
checking for oplocks on the file handle;
creating the file handle with an atomic oplock flag that prevents breaking of the first oplock state between a time when the first client opens the file and when the first oplock state is specified by placing a temporary oplock on the file;
placing a temporary oplock on the file handle; and
upon an unsuccessful request by a second client, returning with an await status signifying that the temporary oplock is not able to be broken and allowing for the unsuccessful request by the second client to be retried, or blocking the second client's request thereafter;
where the second oplock state specifies a higher caching level than the first oplock state.

* * * * *